United States Patent [19]
Cree

[11] Patent Number: 5,468,134
[45] Date of Patent: Nov. 21, 1995

[54] COOLING AND THICKNESS CONTROL FOR EXTRUDED PRODUCTS

[76] Inventor: Robert E. Cree, 127 Bartle Ave., Newark, N.Y. 14513

[21] Appl. No.: 160,233

[22] Filed: Dec. 1, 1993

[51] Int. Cl.$^6$ .................................................. B29C 55/28
[52] U.S. Cl. ........................ 425/72.1; 425/141; 425/143; 425/326.1
[58] Field of Search ...................... 425/72.1, 135, 425/141, 143, 326.1

[56] References Cited

U.S. PATENT DOCUMENTS

| | | | |
|---|---|---|---|
| 3,122,784 | 3/1964 | Jolliffe | 425/141 |
| 3,122,790 | 3/1964 | Albert | 425/466 |
| 3,212,127 | 10/1965 | Flook, Jr. et al. | 425/141 |
| 3,261,893 | 7/1966 | George et al. | 264/40.5 |
| 3,341,388 | 9/1967 | Bunyea | 156/244.23 |
| 3,775,035 | 11/1973 | Scotto et al. | 425/141 |
| 3,819,775 | 6/1974 | Mules | 264/40.6 |
| 3,835,209 | 9/1974 | Karabedian | 264/51 |
| 4,209,475 | 6/1980 | Herrington et al. | 264/40.1 |
| 4,339,403 | 7/1982 | Upmeier et al. | 264/40.1 |
| 4,711,747 | 12/1987 | Halter | 264/40.2 |
| 4,781,562 | 11/1988 | Sano et al. | 425/141 |
| 4,955,802 | 9/1990 | Halter et al. | 425/72.1 |
| 5,110,518 | 5/1992 | Halter | 264/40.1 |
| 5,116,211 | 5/1992 | Shinmoto | 425/141 |
| 5,281,375 | 1/1994 | Konermann | 425/72.1 |
| 5,310,329 | 5/1994 | Cree | 425/72.1 |
| 5,322,431 | 6/1994 | Kahlen et al. | 425/72.1 |

*Primary Examiner*—James P. Mackey
*Attorney, Agent, or Firm*—Hale and Dorr

[57] ABSTRACT

Automatic thickness profiling for use in blown film and other extrusion lines. The automatic system is integrated into an air cooling ring device either external and/or internal to the bubble or extrusion. It comprises one or more high resolution circumferentially variable annular air outlets which act to cool the molten resin in a circumferentially variable way. Thin slide plates remain fixed in place except when adjusted to open or close the local annular air outlet by the action of at least one scanning actuator. The actuator is positioned by control signals generated by a control computer which calculates the appropriate local dimension of the variable air outlet in response to circumferential position correlated with thickness variations detected by a film thickness sensor. The film thickness above the frost line is mechanically scanned around the extrusion. In the case of making blown products with internal cooling, counteracting adjustments are made as local flow areas of the internal cooling device are changed to maintain constant the entrapped air volume. The novel actuation system is also shown to be useful in locally adjusting a finely segmented air lip. A method of correlating thickness changes with respective cooling zones is also disclosed.

31 Claims, 11 Drawing Sheets

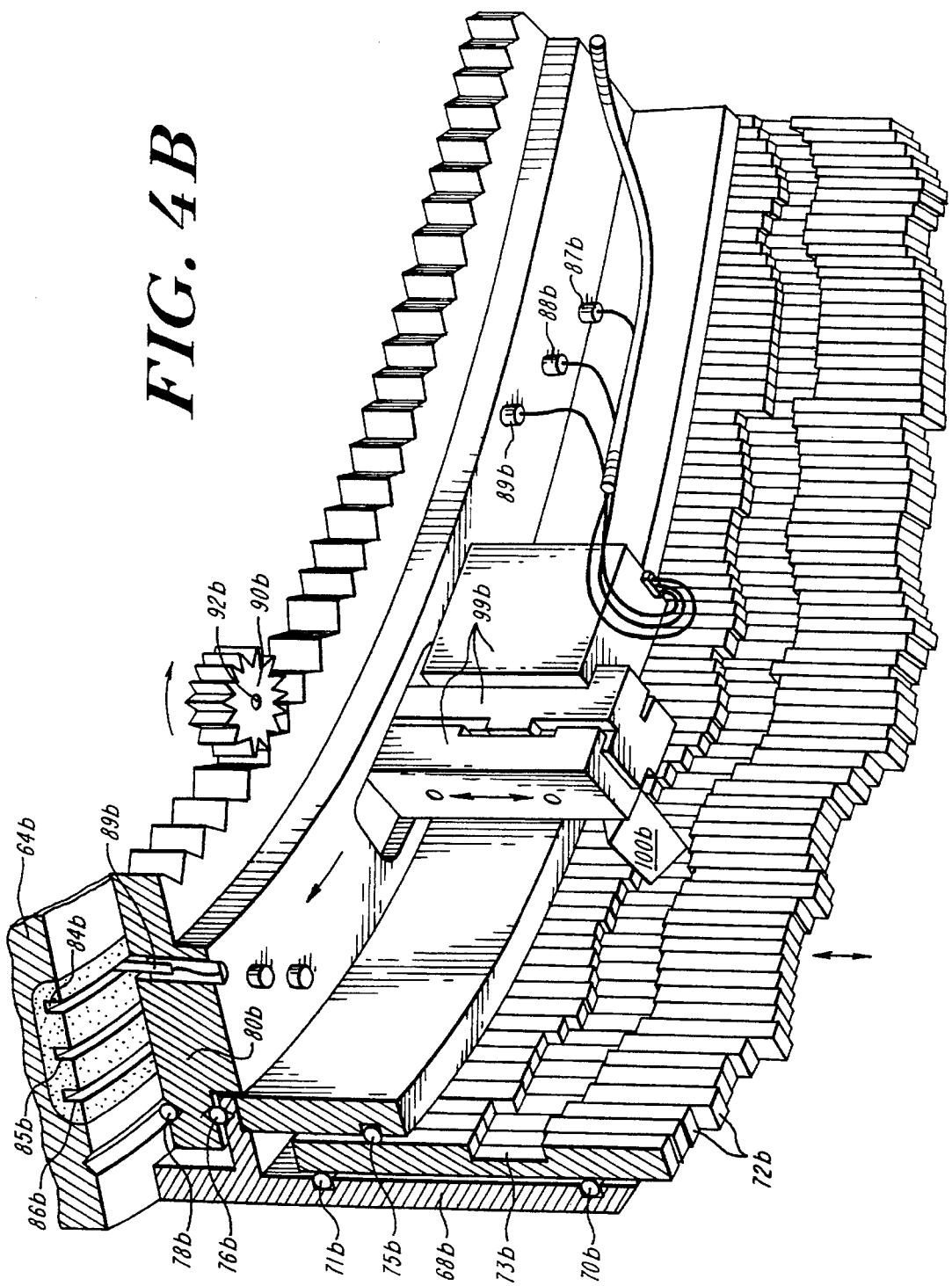

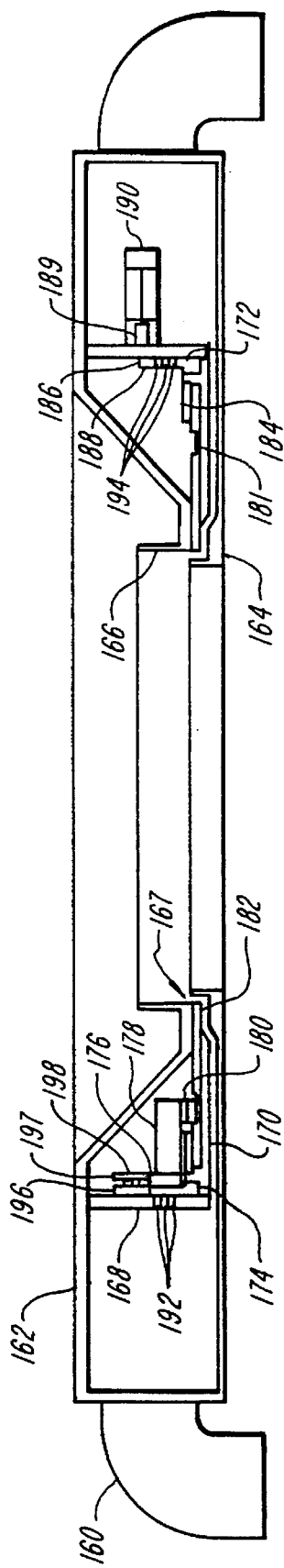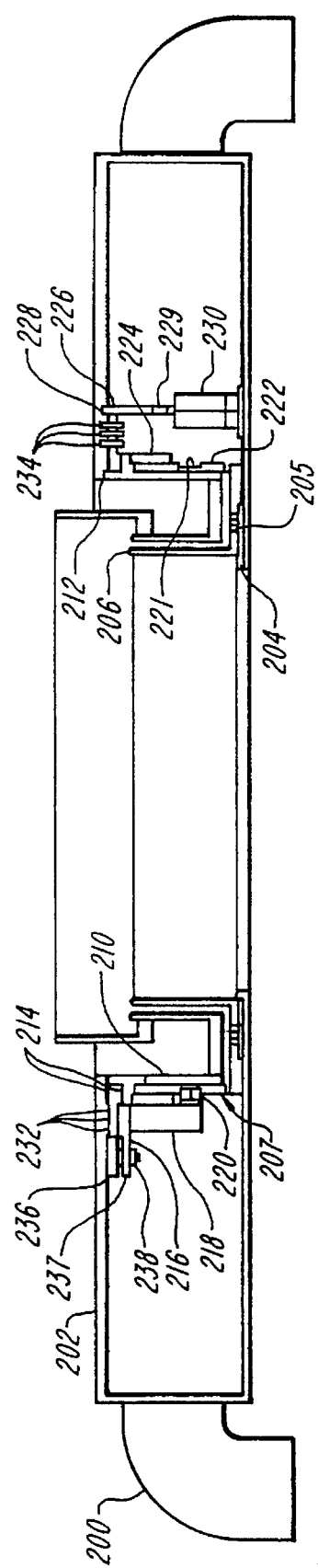

COOLING AND THICKNESS CONTROL FOR EXTRUDED PRODUCTS

BACKGROUND OF THE INVENTION

The present invention relates to improving the quality of products produced by plastic resin extrusion lines and has particular application to the production of blown film.

In the case of blown film, the plastic resin is extruded from a heated extruder having an annular die and the molten is pulled away along the die axis in the form of an expanded bubble. After the resin cools to a set diameter as a result of application of cooling air, the bubble is collapsed and passes into nip rolls for further manufacturing steps.

As the film is extruded, thickness variations occur about the circumference of the bubble. It is recognized that these variations are caused by such factors as circumferential nonuniformity in flow distribution channels (ports and spirals) within the die, melt viscosity nonuniformity, and inconsistent annular die gaps through which the polymer exits the die. Additionally, variability of the cooling air and non-uniformity of air aspirated into the cooling air stream from the atmosphere surrounding the extrusion line are major contributors to film thickness variation. Many film processors rely on conventional blown film equipment which typically yields an average variation of ±10 to 20% in film thickness, overall.

The presence of such thickness variations creates problems for downstream conversion equipment such as printing presses, laminators, or bag machines. In processes where the film is not converted in-line, but is wound onto a roll prior to converting, the thicker and thinner areas of many layers on the roll create hills and valleys on the roll surface which deform the film and magnifies the subsequent converting problem.

It is desired to obtain higher quality film during the extrusion process so that the downstream equipment can be run faster and produce better end use products with more consistent thickness.

The crudest and most widely practiced method for controlling blown film gauge variation is the use of fans and barriers placed strategically around the process to correct for ambient air variability. This is usually done in combination with manual operator adjustment of the annular die gap through which the polymer melt exits to help minimize die gap and melt viscosity variability effects. The main problem with this approach is that the ambient conditions surrounding the process constantly change and require continuous monitoring and barrier and/or fan repositioning. This approach also does nothing to take care of the relatively narrow thickness bands associated with the die ports and spirals. Use of this relatively primitive method results in typical thickness variations of ±10 to 15 percent.

Improvement over such manual adjustments is found in present art systems which actively measure the thickness of the film on-line. Employing closed loop control, these systems use computers which track thickness variation as it occurs in the still inflated bubble and calculate corrections to individual control zones within the die or cooling systems. These zones impart localized thickness variations which are opposite to those measured and thus to some extent correct for thickness deviations circumferentially around the bubble, including those caused by the ports and spirals within the die. Systems with control zones located within the die yield results in the range of ±4 to 7 percent thickness variability. Air cooling ring based systems do not historically perform as well and yield typically ±6 to 10 percent variability.

Though active systems as presently known do remove a significant portion of thickness variations, they unfortunately fall short of desired performance. Most film processors desire similar or better thickness tolerances to that achievable with films produced using cast film processes. Cast film is produced on flat, linear dies which are capable of direct, localized mechanical adjustment of the die gap with results typically of ±1 to 2 percent variation. There are several drawbacks which limit the overall performance of present art systems, and there are other drawbacks such as cost and complexity that deter their use.

A drawback that applies to both blown and cast film systems is that ultimate resolution of the thickness control is limited by the physical size of the actuator used to control a given zone. Typically, for this reason, active control zones are ½ to 1 inch wide. This allows for just 30 to 60 zones on moderately sized blown film dies of 10 to 12 inches in diameter. In a typical blown film process, thickness can change by several percent across the span of just one such zone. Resolution therefore limits present systems.

Another drawback, applicable to blown film lines, is reduced effective resolution due to expansion in diameter of the bubble outward from the region of control near the die lips. This expansion spreads the effect of each active control zone and thus reduces the ultimate circumferential resolution of the system. For instance, a 3 to 1 bubble expansion ratio with control zones of ½ inch width results in a final resolution after film expansion of 1½ inch.

A major drawback of known active control system is high cost and complexity. Since each zone requires an actuator, individual control signals must be communicated and mounting hardware or mechanical linkages must be provided. Each actuator must be wired back to the central controller and as the number of zones is increased for better resolution, the complexity and associated cost rises in proportion. In retrofit applications, the existing die or air ring must also be replaced which adds significantly to the cost. Continuing operating costs associated with initial startup and maintenance of these complex systems are also quite high.

Yet another drawback is that present active systems do not adequately compensate for correlation problems caused by the location of the thickness measuring sensor. These sensors, by necessity, are located some distance away from the actual control zones and any shifts in the position of thickness bands will cause corrections to be applied in the wrong place. In order to average over time any remaining thickness variations on the finished roll, most blown film manufacturers rotate or oscillate either the die and cooling ring assembly or the nip roll and collapsing shield assembly. This oscillation or rotation causes the position of a given thickness band to shift in a spiral fashion, circumferentially as it travels from its point of origin to the sensing point. The amount of shift is related to many factors but is approximately proportional to the speed of oscillation or rotation and the time it takes for a point on the surface of the blown film bubble to travel from control zone to sensor. Presently known systems do attempt to correct for such correlation errors, however, a multitude of processing variables affect the position of thickness bands and in practice, it is very difficult to collect data and accurately calculate the exact position over time where the band of thickness originated. Resulting errors range from as little as 5 to as much as 20 degrees or higher and have served to further reduce the effective resolution of the prior systems.

Further drawbacks relate to individual approaches that have been proposed to control thickness variation. One approach seeks to control blown film thickness variation by direct mechanical adjustment and deformation of the die lips, similar to that used in cast processes. In these systems, localized, circumferentially variable, mechanical adjustments to the die lip cause detrimentally large hoop stress and elastic forces to develop in the round tube which resist deformation and spread the effect of the adjustment over a larger area than that intended thus limiting the effective resolution.

Another proposed approach utilizes direct, circumferentially variable, heating and/or cooling of the exit lip from the die. In these systems, individual controllers actuate cooling fluid flow through passages within the die lip or control spaced apart individual heaters embedded in the die lip which locally cool or heat the lips. Since heat spreads outward in all directions through the steel, the effect is not as locally concentrated as desired and resolution is reduced.

Yet another proposed approach employs circumferentially variable heating and/or cooling of the cooling fluid (typically air) which flows from the primary cooling ring surrounding the blown film bubble. Here again, individual actuators control the local temperature of the cooling fluid and affect the thickness of the film by changing the amount of local cooling. Due to the large volumes of air and associated turbulence involved, mixing takes place which significantly degrades the performance of this type of system. Also, since temperature differences of about 350 to 400 degrees fahrenheit exist between the polymer exiting the die and the air from the cooling ring, the effect on film thickness is very limited since it is difficult to locally cool an area by a significant amount. Heated systems can achieve larger cooling fluid temperature changes but have the drawback of losing cooling capacity since overall temperature is raised thus forcing the rate of film production to be lowered.

Another proposed approach alters in a circumferentially variable way, the flow of air exiting the primary cooling ring surrounding the exterior of the blown film bubble. Individual actuators mechanically alter the flow of cooling fluid through associated control zones. Thickness of the film is affected since more or less heat is removed due to the presence of more or less cooling fluid. Here again, significant mixing occurs which degrades the performance of these systems. Additionally, since cooling rings provide the major source of stabilization for the bubble and this stabilization is highly dependent on the flow of cooling fluid, these types of systems have an added drawback in that bubble stability is degraded and/or limitations must be placed on the range of adjustment of cooling fluid flow. This serves to greatly limit the performance of these systems.

In a case having superficial similarities to a blown film process but which in fact is significantly different, a processor has proposed use of variable internal cooling in the production of slit foam material. In this case a tube of extruding foam is pulled over a fixed annular mandrel which quenches the foamed material a fixed distance away from the die face. The cylindrical foam material is slit just after solidifying on the mandrel and is pulled away by a pair of nip rollers. The mandrel is supported from the outside by arms passing through the slits at the sides of the foam product. In this case the foam does not form a "bubble", since the inside is open to atmosphere. A thickness control air cooling ring of the type which circumferentially varies air flow described above, is mounted adjacent to the die on the exterior of the tubular foam. For this air ring, a multitude of flow control dampers with individual actuators are employed. A similar but mirror image air ring was proposed for use inside the open tubular form. For the internal air ring, all actuator control cables and air flow pipes were conveniently suspended from external supports which pass through the slit open sides of the once tubular form. Such arrangement can not function on a blown film production line because the external mounting structure cannot be used on tubular processes which have a closed, blown "bubble". Also cooling air flow changes which take place to control film thickness as described would cause a net flow imbalance of entrapped air that would cause final film size to be uncontrollable. This problem does not exist for the slit foam process since exhaust air simply flows either around or through holes in the mandrel and out the open sides of the slit tubular form.

SUMMARY OF THE INVENTION

According to one aspect of the invention, there is provided an air cooling device for an extrusion line for producing a running length of extrudate from a die, the cooling device constructed to provide a distributed flow of cooling air contacting a surface of the extrudate at a region downstream from the die, the cooling device having a series of adjustable members associated with respective zones of air flow for varying the flow at the zones, and at least one movable actuator is constructed to move serially from one zone to another and, at each zone, constructed to adjust the position of the respective adjustable member to adjust the volumetric flow in the zone.

Preferred embodiments of this aspect of the invention have one or more of the following features.

The die is circular and the actuator is constructed to move on a circular track from zone to zone. The die is annular, constructed to extrude a tube and the cooling device is constructed to provide a distributed flow of cooling air to the interior surface of the extruding tube, the adjustable members and the movable actuator being disposed within the interior of the extruding tube. The extrusion line is of the blown type in which the extrudate forms an air-confining bubble which is closed at the end opposite from the die by sealing of the sides of the tube together to substantially prevent air loss, and the movable actuator is energized and controlled by leads introduced into the bubble through a passage in the die.

In other embodiments, the air cooling device is constructed to provide a distributed flow of cooling air to the exterior surface of the extrudate, preferably the die being annular, constructed to extrude a tube and the cooling device constructed to provide a distributed flow of cooling air to the exterior surface of the extruded tube.

Useful in various embodiments, the actuator is controlled in response to measurements of a detector located downstream of the cooling device, the detector being adapted to measure a characteristic of the extrudate that varies in response to change in air flow from the cooling device. In preferred embodiments of this feature the extrudate is subjected to tension as it emerges in heated form from the die and the detector is constructed to measure thickness of the extrudate at a region downstream from the cooling device. Preferably the detector scans thickness of the extrudate and feeds its thickness and position data to a control computer, the control computer being adapted to act on the data to correlate given locations of thickness measurement to respective zones and to establish required changes in the flow cross section of the zones to reduce thickness variation about the extrudate.

In preferred embodiments a plenum is provided and the volumetric flow through the zones is controlled by respective adjustable members that control the flow cross-section of respective apertures.

In various of the embodiments as described above, the adjustable members preferably comprise slideable members. Preferably, each of said slideable members is resiliently engaged by a friction element that holds it in place after its adjustment. Preferably the slideable members comprise a series of side by side slide plates. In certain embodiments, the end portions of slideable members comprise segments of an air ring lip.

In the presently preferred embodiment of the system of the invention the actuator is in the form of a motor-driven wedge constructed to enter with advancing motion into an opening at the side of each adjustably slideable member and to move laterally in response to a control signal to reposition the respective member before moving on to the next. Preferably such actuator is employed in combination with a detector for measuring thickness of extrudate following said cooling device and a computer responsive to said thickness measurements to produce said control signals for positioning respective slideable members.

In certain preferred embodiments at least two series of the adjustable members are spaced apart along the direction of travel of the extrudate with at least one of the movable actuators for each of the series, the actuators for each of the series being mounted on a common carrier that moves the actuators serially along their respective series of adjustable members. Such a design is advantageously used in an internal bubble cooling device in which both of the series of adjustable members are mounted to reside within said bubble.

In another preferred embodiment constructed for use in a blown film line, at least two series of adjustable members are provided, one disposed on the exterior of the bubble and the other disposed on the inside of the bubble, each series having its respective actuator.

According to another aspect of the invention, an air cooling device is provided for an extrusion line for producing a running length of blown tubular form extrudate from an annular die, the cooling device constructed to provide a distributed flow of cooling air about an inner surface of the tubular extrudate at a region downstream from the die, the cooling device having a series of adjustable members associated with respective zones of air flow for varying the flow at the zones, at least one movable actuator constructed to move serially from one zone to another and, at each zone, constructed to adjust the position of the respective adjustable member, to adjust the volumetric flow along the inner surface of the extrudate in the zone.

Preferred embodiments of this aspect have one or more of the following features.

The cooling device is operatively connected with an internal bubble cooling control system that includes supply and exhaust blowers and a bubble size control device. A single actuator moves between the respective zones. A control system includes a computer responsive to a signal related to measured thickness of the extrudate to provide control signals to the at least one movable actuator.

In one embodiment, an adjustment of one of the adjustable members at one zone causes an adjustment associated with other zones to maintain the volume of air in said tube constant.

In the presently more preferred embodiment, the cooling system comprises an input blower and an output blower and, the control system is constructed to adjust the speed of at least one of the blowers to maintain the volume of air in the tube constant upon change in the adjustment of one of the adjustable members. Preferably in this case the control system includes a computer for receiving signals related to size of the tube and signals related to flow cross-section of the zones and based on the received signals provides output signals to at least one of the input and output blowers to change the air flow of the blower. Preferably the computer provides signals to one of the input and output blowers based on the size of the tube and provides signals to the other of the blowers based on the sum of the flow cross-sections of the zones. Preferably the adjustable members are slideable members having features described above.

According to another aspect of the invention an internal cooling system is provided for cooling extrudate in the form of a tube emerging from an annular extrusion die, a dimension of the tube being dependent upon the amount of air entrapped in a closed volume of the tube adjacent the die, the internal cooling system constructed to distribute a flow of cooling air to the inner surface of the extrudate through a series of flow zones, the flow cross-sections of which are adjustable in response to thickness measurements, and a control system is adapted to monitor the flow cross-section of each of the zones, the control system constructed and arranged to make compensating adjustments in the internal cooling system to maintain the volume of air in the tube constant upon flow cross-section change at any of the zones. Preferably, this internal cooling system further comprises a series of adjustable members associated with respective zones of the flow, and at least one movable actuator constructed to move from one zone to another and constructed to adjust the position of the respective adjustable member to adjust the volumetric flow in the zone.

According to still another aspect of the invention a method is provided for controlling cooling of a circular extrudate which employs a series of circumferentially arranged air cooling flow control devices downstream from the extrusion die and a thickness detector constructed to measure thickness of the extrudate at positions around the extrudate, the method comprising intentionally varying a selected control device in a manner to introduce a band thickness significantly different from the main body of the extrudate, detecting the location of the thus-produced band with the detector, and correlating the position of the detector at the taking of such measurement with the respective adjustable member and storing such correlation, and subsequently, in controlling the adjustable member of the device, employing the correlation data to relate thickness measurement to the respective adjustable member.

Thus, according to the present invention, an automatic thickness profile control system or "profiler" is provided with special applicability to a blown film extrusion line. The blown film extrusion line is typically of the type comprising a heated extruder for melting and pressurizing a flow of molten plastic resin, an annular die through which the molten resin extrudes and from which it is pulled away along an axis in the form of an expanding bubble, and at least one air cooling ring device defining a plenum surrounding the base of the bubble and having an annular outlet arrangement constructed to direct a stream or streams of primary cooling air into cooling contact with the base region of the bubble, to flow along the bubble in the direction of film travel and cause the resin to cool as the film expands until a substantially fixed maximum bubble diameter is achieved at a frost line spaced from the annular die.

The automatic thickness profiler functions as an integral part of either the internal bubble cooling (IBC) system or an external air ring. According to one preferred case the invention comprises an automatic thickness profiler integrated with the annular IBC plenum having an annular air outlet, the automatic thickness profiler constructed and arranged to be disposed inside the bubble at a level below the frost line and surrounded by the air cooling ring. The automatic thickness profiler is coaxial with the film line axis and of slightly smaller size than the extruding tube so that its outlet mechanism is spaced a small distance radially inward from the bubble and from the air cooling ring outlet. The IBC plenum is adapted to receive air from a source located external from the bubble, and the automatic thickness profiler is arranged to provide a directed source of the air about the base of the bubble adjacent to the die exit lip. The automatic thickness profiler is such that air flow passes out of the annular air outlet and is directed into cooling contact with the base region of the bubble, to flow along the inside of the bubble in the direction of film travel and cause the resin to cool as the film expands until a substantially fixed maximum bubble diameter is achieved at a frost line spaced from the annular die. The automatic thickness profiler is constructed and arrange to provide circumferentially variable air flow out of the annular air outlet which acts to cool the molten resin in a circumferentially variable way. The annular air outlet is comprised of a high resolution circumferentially variable outlet through which IBC air flows and is adjustable by the action of at least one scanning actuator. The actuator is positioned by control signals generated by a control computer which calculates the appropriate dimension of the high resolution circumferentially variable outlet in response to circumferential thickness variations detected by a film thickness sensor. The film thickness sensor is generally disposed above the frost line and is mechanically scanned around the circumference of the bubble. The invention includes the automatic thickness profiler in combination with the extrusion line and the automatic thickness profiler per se.

Various preferred embodiments of this aspect of the invention have one or more of the following features of the invention.

The automatic thickness profiler features a means to adjustably vary in a circumferential way the flow of air that exits the IBC annular air outlet, e.g., to control the final thickness of the formed tubular film bubble. Preferably for this feature, the annular air outlet of the automatic thickness profiler includes one or more outlets spaced apart inside of the blown film bubble in the direction along the axis of the tube for providing respective spaced apart annular air flows at different levels of the bubble, and the means to adjustably vary the air flow includes a mechanism to circumferentially vary the flow of air exiting at one outlet level independent of other outlet levels which may exist. In one preferred case the outlet for one of the levels is disposed both radially and axially adjacent to the die lip in a side surface of the plenum and the outlets for the other levels are disposed axially in the direction of film travel in a side surface of the plenum. Outlets face generally radially outward from the axis of the bubble, and the mechanism to vary the air flow includes a series of relatively thin air flow adjusting slide plates associated with each annular air outlet which includes structure to selectively vary in a circumferential way the effective air-flow cross section of the annular air outlet. In this case, preferably a single servo driven adjusting lever is scanned around the inside of the annular air plenum which engages sequentially with each adjusting slide arranged in a manner to enable movement of each air flow adjusting slide for varying the effective cross section of the respective outlet.

The automatic thickness profiler features annularly arranged air outlets at a plurality of levels disposed in a side surface facing outward toward the bubble, outlets at different levels having respective flow axes that may have differing angular orientations relative to the film line axis. Preferably, the outlets in each of the levels comprise a continuous annular air outlet in a wall of the IBC annular plenum in which at least one may have a circumferentially variable effective cross section.

The automatic thickness profiler preferably is constructed and arranged so that it is disposed directly adjacent to the die face and is coaxial with the axis of the die and blown film bubble. The automatic thickness profiler is also preferably constructed to provide cooling air from the first air outlet as close to the exit lip of the annular die as is practical.

In another aspect of the present invention the automatic thickness profiler has a plurality of air flow adjustable slides arranged to vertically form one half of the annular air outlet. Each slide preferably is as circumferentially thin as is practical, which allows for very high resolution adjustment of the cross section of the air outlet through which cooling air emerges. The outlet passage is directed to supply the air flow path in directions generally outward toward the inside surface of the molten film bubble.

In yet another aspect of the present invention the air flow adjusting slide members are individually positioned by a single actuator which is sequentially scanned around the circumference of the air outlet and preferably inside the IBC annular plenum. In this preferred embodiment a servo driven adjusting wedge engages with a groove cut into the inner surface of each adjusting slide and is arranged so that the adjusting slide is moveable to open or close the cross section of the annular air outlet, each slide remaining fixed in position during periods that the adjusting wedge is not influencing its position.

In preferred embodiments, the air outlets of the automatic thickness profiler are adjusted by control signals generated by a control computer based on sensors responding to film motion parameters, film thickness and associated circumferential position around the blown film bubble, and circumferential position of the annular air outlet adjusting actuator and associated adjusting wedge. Control signals are transmitted to the actuator or actuators by electrical wires and slip ring assemblies which allow for rotational motion of the actuator relative to the IBC annular air plenum and outlets.

In another aspect of the present invention the correlation between the circumferential position of measured thickness and the associated adjusting slide which will effect corrections to film thickness at that position is calibrated by purposefully inducing narrow thickness bands at one or more circumferential locations that are detectable by the thickness sensor. The thickness sensor is monitored by the control computer for the sensor position where the narrow thickness band or bands occur and precise calibration is thus achieved. Information is stored by the computer which enables it to predict the proper position correlation based on information collected from other sensors monitoring the motion of the film and any rotating equipment components such as oscillating hauloffs or dies that affect position correlation between measured thickness bands and automatic thickness profiler control zones.

Furthermore, in preferred embodiments, the annular air outlets of the automatic thickness profiler are sized to supply a substantial volume of air adequate to meet the flow requirements needed to effect thickness corrections to the blown film bubble and non-adjustable air outlets can be added to obtain higher cooling rates but at least one and preferably the air outlet closest to the die face is adjustable.

In yet another aspect of the present invention the control computer maintains overall cross-sectional area of the annular air outlets as close to constant as possible to limit the change in total IBC air flow thus minimizing the resulting detrimental effect of changing bubble size.

In another aspect of the present invention the automatic thickness profiler provides a continuous control signal proportional to present total annular air outlet cross sectional area to the IBC size control system to allow for total air flow corrections to be made. The IBC size control system is designed to respond to the automatic thickness profiler total lip area control signal in a way which alters IBC size control flow control signals to maintain the net flow of IBC air into and out of the bubble constant, e.g., to allow for precise control of the final diameter of the formed tubular film bubble.

Furthermore, in preferred embodiments, the automatic thickness profiler and the IBC diameter control device can be integrated together to form a single control device performing both thickness and sizing functions.

In other embodiments, any number of actuators less than one actuator per control zone can be used.

A further embodiment of the invention uses a scanning actuator in primary cooling rings surrounding the exterior of the blown film bubble. This has the advantage of reduced cost and provides the ability to effect shape changes in the face of the air ring lip.

Another embodiment of the invention is the use of an IBC automatic thickness profiler in combination with an external cooling ring or die based thickness profiling system or combinations of all three. Such systems provide capability to effect very large thickness variations in the film to correct for severe problems.

In yet another embodiment of the invention the control signals to the profiling actuator are accomplished without slip rings by use of radio telemetry equipment specially designed to provide required control signals directly to actuators. This is useful in applications which rotate or oscillate the die assembly for purposes of film thickness variation randomization on wound rolls. Another method which eliminates the slip rings is to oscillate the profiling actuator in alternating clockwise and counterclockwise directions allowing control wires to alternately wind and unwind inside of the annular air plenum.

A further embodiment uses the variable gap generated by the automatic thickness profiler to control the flow of very cold fluids such as gases liberated from boiling liquid nitrogen. These very cold gases have a significantly larger temperature differential relative to the molten plastic film being cooled and would have proportionally a larger effect. These cold gases can be used exclusively or be mixed with traditional air to achieve the desired results.

BRIEF DESCRIPTION OF THE DRAWINGS

FIG. 4b is a partially cut away perspective view of the actuator mechanism of the automatic thickness profiler of FIG. 4.

FIG. 8 is a schematic cross sectional side view of an automatic thickness profiler installed in an external, dual flow air ring.

FIG. 9 is a schematic cross sectional side view of an automatic thickness profiler installed in an external, single flow air ring.

DESCRIPTION OF THE PREFERRED EMBODIMENTS

Figure 1:
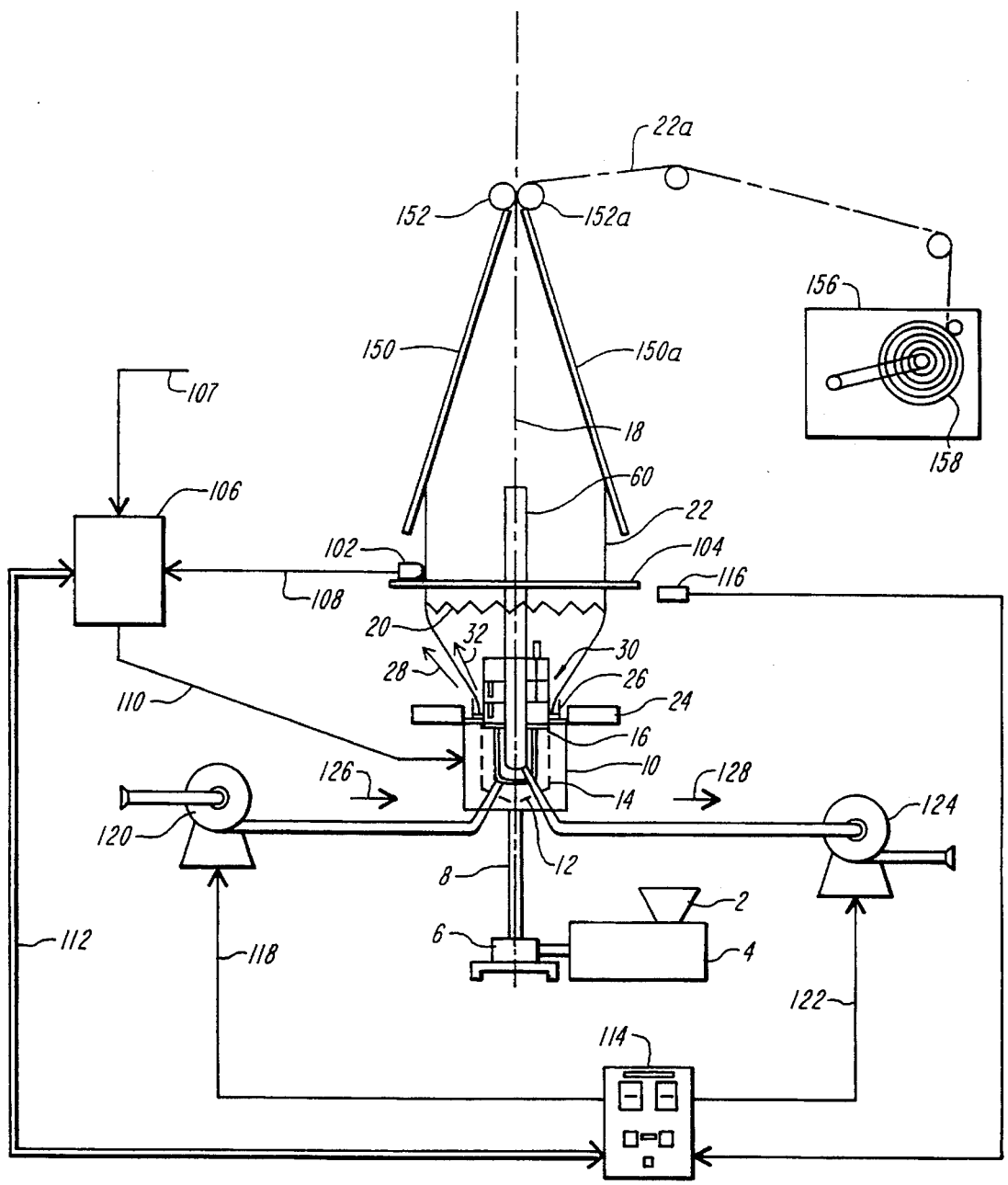
FIG. 1 is a schematic side view showing a blown film extrusion apparatus which includes internal bubble cooling and an automatic thickness profile control ("profiler") according to the present invention.

FIG. 1 illustrates the known technique of extrusion of molten plastic resin to form blown film. Plastic pellets are fed into a feed hopper 2 and are transferred into an extruder 4 where they are melted, mixed and pressurized by the action of an extruder screw. The melt exits extruder 4 and is conveyed through die block 6 where it is directed upward through vertical neck 8 into the bottom of the blown film die 10 where the plastic melt flow is split to flow through several holes or ports 12 which radiate outward inside of the die 10. Die 10 is designed to recombine the melt passing through ports 12 into an annular, cylindrical plastic melt flow 14 which is then extruded from an annular orifice die lip 16 at the top of die 10. This annular melt flow is continually drawn away from the die lip 16 in a manner generally concentric with a process centerline 18. The annular diameter of the melt flow enlarges as it progresses from the die until it reaches frost line 20 (indicated diagrammatically by a saw-tooth line) to form a cooled, solidified plastic tubular film bubble 22.

Primary cooling air for the process is supplied to external air ring 24 from a source not shown. The air is applied to contact the extruding plastic melt adjacent the base portion of the bubble by air ring lips 26. The air flows in annular air streams 28 along the outside expanding surface of the bubble. Inside the bubble and concentric with centerline 18 is an automatic thickness profiler 30 which provides a circumferentially controlled, variable source of cooling air (In this preferred embodiment the automatic thickness profiler is integrated with internal bubble cooling, i.e. with "IBC" hardware). The internal cooling air is applied to contact the inside surface of the extruding plastic melt adjacent the base portion of the bubble and flows in circumferentially controlled, variable annular air streams 32 along the inside expanding surface of the bubble. The plastic melt is cooled sufficiently to solidify into tubular bubble 22 at frost line 20.

Internal cooling air 126 is provided by blower 120, in the direction shown, through air passages in the die 10 to the automatic thickness profiler. Bubble 22 has a closed volume due to being sealed at the top by nip rolls 152, 152a and at the bottom by die 10. To maintain the bubble volume constant, air is exhausted out of bubble 22 at the same rate that it is pumped in through pipe 60 and die 10 in the direction indicated 128 through blower 124. IBC size controller 114 monitors bubble size using distance sensor 116 and controls the air flow 126 into bubble 22 and air flow 128 out of bubble 22 to be equal, to enable the annular dimension of bubble 22 to remain constant, according to known techniques.

Also, according to known techniques, tubular bubble 22 is continually drawn upward through collapsing frame 150, 150a where it is compressed into a flat sheet of film 22a, also known as "layflat," as it passes through a nipping point between nip rolls 152 and 152a. These nip rolls are driven to continually pull the film through the extrusion process. Layflat film sheet 22a is then converted and/or wound into finished product 158 by downstream processing equipment such as winder 156.

Non-uniform features in the extrusion system, such as discrete distribution ports 12 in die 10, cause circumferential thickness variations in bubble 22. Thickness variations are measured by sensor 102, e.g. of the known capacitive or nuclear back-scatter types, which is scanned around the circumference of bubble 22 by circularly rotatable track 104. Thickness information and respective position information of the thickness sensor are continually provided over data link 108 as the thickness sensor rotates. Additional sensed information e.g. the speed of travel of the blown film or, in the case of a rotating die, sensor information concerning die speed and position, are provided over data link 107 to automatic thickness profiler controller 106. Controller 106 computes and sends control signals through the die to thickness profiler 30 mounted inside bubble 22. This produces desired circumferential variations in internal air stream 32 to cause the plastic melt to cool faster or slower at selected locations. This in turn produces thickness corrections around the circumference of the cooled tubular bubble 22, to reduce thickness variation in film 22a.

As circumferential changes are made to air flow 32 in response to automatic thickness control, the flow cross-section for air 126 into bubble 22 changes. Automatic thickness profile controller 106 provides signals indicative of the changes being made by the profiler and transmits these signals via data link 112 to IBC size controller 114 which responds to maintain net flow into bubble 22 constant. In this preferred embodiment the speed of input blower 120 is altered by controller 106 to effect this control response and results in maintaining the annular dimension of bubble 22 constant despite the flow-varying action of the controller. In alternative embodiments the speed of the output blower may be altered in opposite sense, or a combination of changes to supply and exhaust blowers can be employed.

Figure 2:
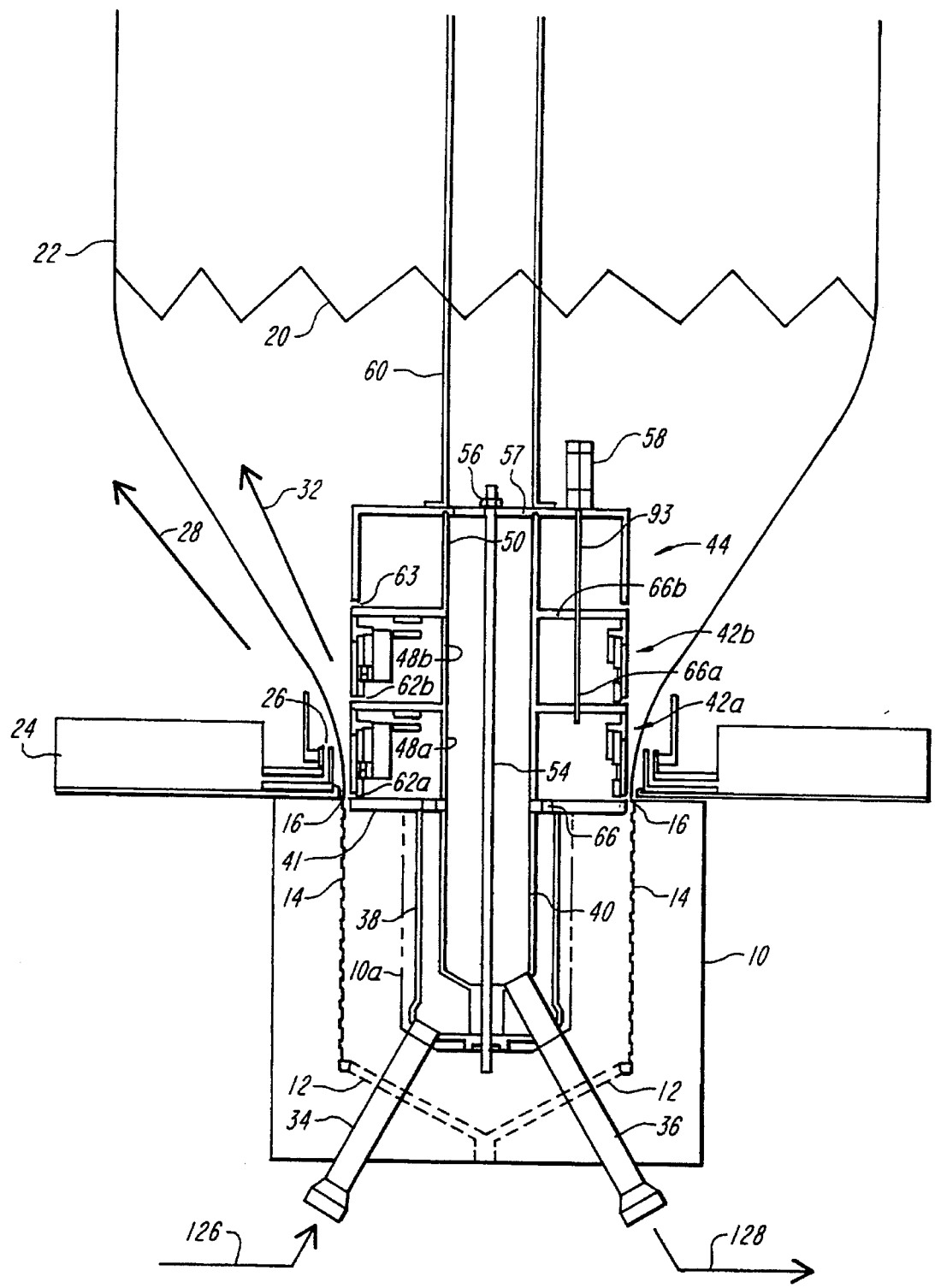
FIG. 2 is a schematic side view on an enlarged scale of the extrusion die, cooling apparatus and automatic thickness profiler of FIG. 1.

Referring to FIG. 2, bubble 22 is cooled externally by cooling ring 24 with associated cooling lips 26 and air flow 28. For internal bubble cooling, air flow 126 is fed through supply pipes 34 through die 10 into die cavity 10a. IBC supply plenum 38 receives this air and conveys it upward around IBC exhaust plenum 40 and through holes 66 in bottom plate 41 and into the first automatic thickness control chamber 42a. Air passes through holes 66a into second control chamber 42b and through holes 66b into chamber 44. Circumferential, controlled variable air flows out gaps 62a and 62b effect thickness control and internal cooling. Motor 58 turns drive shaft 93 which provides for rotary motion used to effect progressive change to the circumferential cross sectional area of gaps 62a and 62b, gap 62a being generally located as close as practical to die lip 16 to enhance the resolution of thickness control on film bubble 22. A circumferentially uniform air flow is maintained out of gap 63 to add cooling only. Internal cooling air 32 flows upward inside bubble 22 generally past frost line 20 and is exhausted through stack 60, through tubular spacers 50, 48b and 48a into exhaust plenum 40 and out of die 10 through exhaust pipes 36 as exhaust air flow 128.

Figure 3:
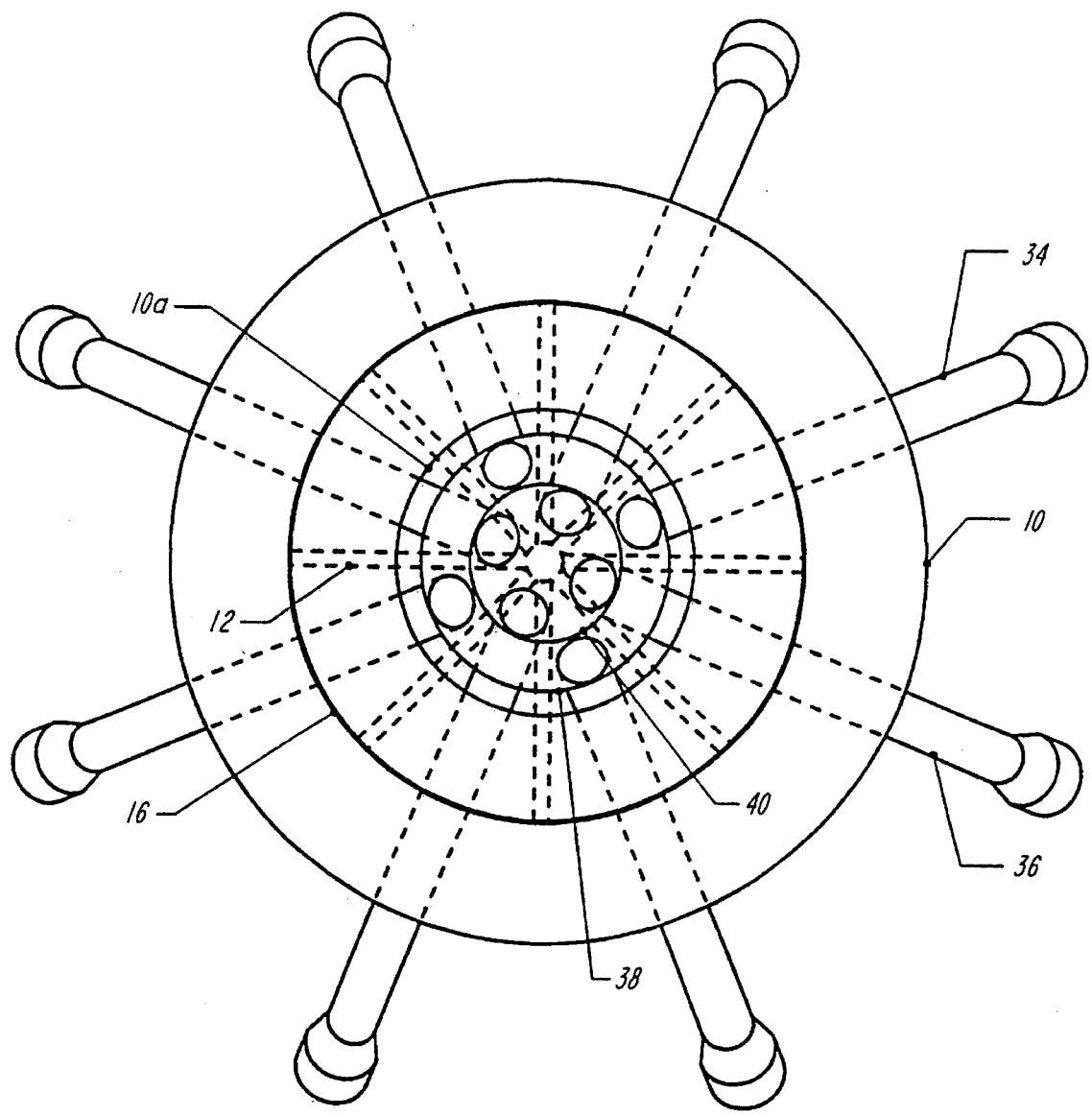
FIG. 3 is a schematic plan view of a blown film die showing the general arrangement of die ports and IBC cooling pipes.

FIG. 3 shows a schematic plan view of die 10 which shows die ports 12 radiating out through die 10 between IBC air pipes 34 and 36. Polymer distributes inside die 10 and exits at die lip 16. IBC air pipes 34 and 36 pass through die 10 and pipes 34 terminate inside plenum 38 and pipes 36 terminate inside plenum 40. Plenums 38 and 40 are housed within cavity 10a of die 10. Electrical power for motor 58, leads for sensed signals from the profiler to controller 106 and control signals from the controller 106 to the profiler, not shown, are bundled into one or more small cross-section cables that are placed in one or more of the air pipes passing through the die.

Figure 4:
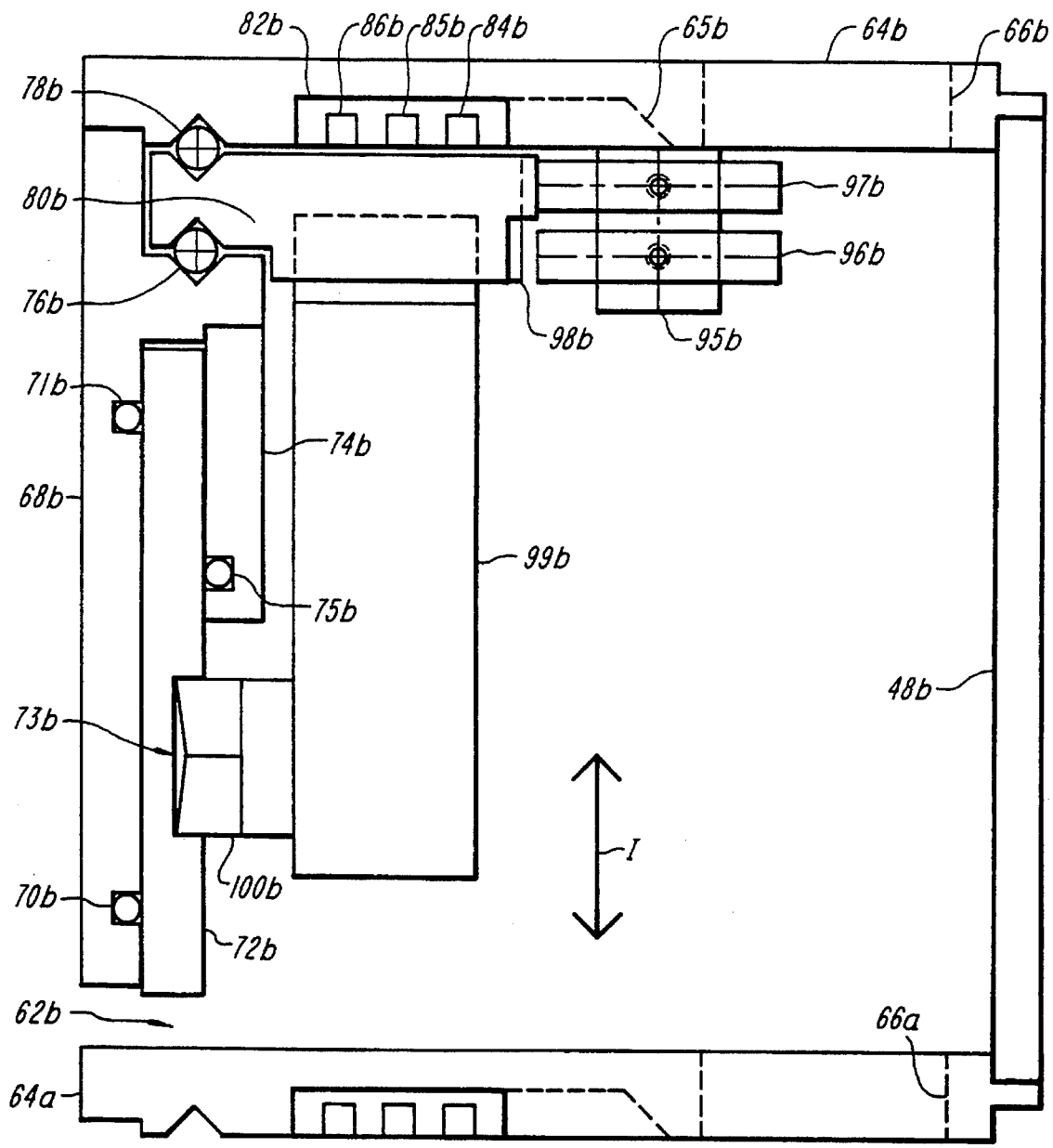
FIG. 4 is a partial cross sectional side view of the left side of the mechanical portion of the automatic thickness profiler of FIGS. 1 and 2.
Figure 4A:
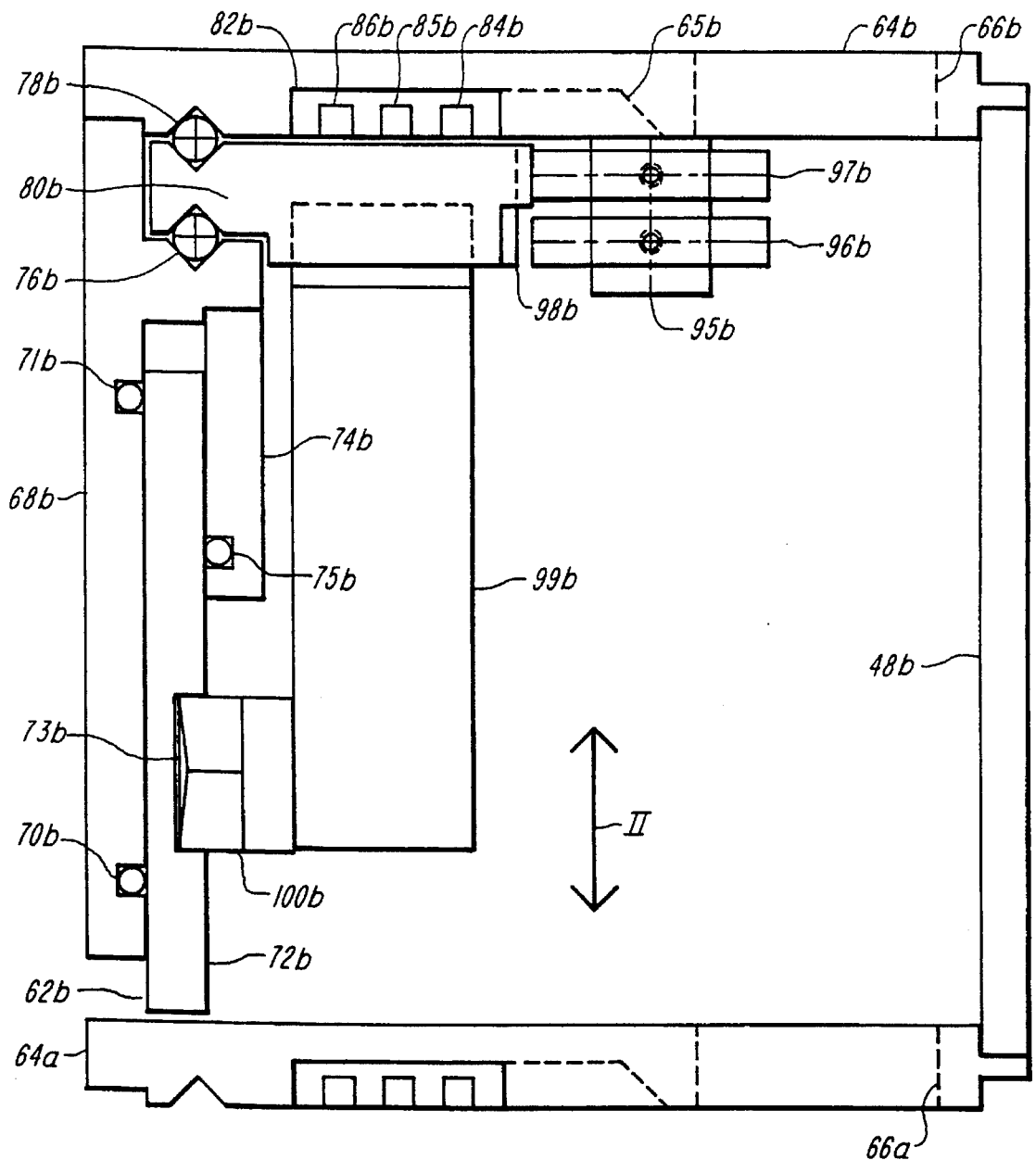
FIG. 4a is a view similar to FIG. 4 but with the actuator of the profiler in position to reduce air flow relative to the position in FIG. 4.

FIGS. 4 and 4a are similar partial cross sectional side views of the mechanical portion of the automatic thickness profiler which circumferentially alters the dimension of gap 62b, compare FIGS. 4 and 4a, while FIG. 4b shows the mechanism in perspective. The top side of plate 64a is a fixed flat surface which forms the lower half of gap 62b. The upper half is made up of a multiplicity of relatively thin vertically moveable slide plates 72b or fingers (shown in FIG. 4 from the side—thin dimension is into the page) which are retained in position by friction pads 70b, 71b and 75b. Friction pads 70b and 71b are fixed in place by external wall 68b. Pad 75b is fixed in place by internal retaining wall 74b. Each slide plate has groove 73b cut into the inside surface which is sequentially engaged by positioning wedge 100b. Positioning wedge 100b is attached to actuator 99b which moves positioning wedge 100b up or down in response to a control signal from controller 106 in FIG. 1. Actuator 99b is attached to rotating gear plate 80b which has gear teeth machined into its inside diameter. The assembly of 100b, 99b and 80b is free to rotate circumferentially around central axis 18 shown on FIG. 1 by riding on ball bearings 76b and 78b which are retained in corresponding annular grooves in the fixed structure as shown. The rotational position of assembly 100b, 99b and 80b is measured by proximity switch 96b which triggers once per revolution when reference block 98b passes by and also by proximity switch 97b which triggers with much finer resolution as the assembly rotates. Proximity switches 96b and 97b are fixed in place by mounting bracket 95b and in combination provide continuous feedback to controller 106 in FIG. 1 of the position of assembly 100b, 99b and 80b. Inner wall 48b acts to maintain plates 64a and 64b aligned with respect to one another. Actuator 99b is a servo control of typical construction. A small DC motor is employed with position sensing by a potentiometer and feedback to position the wedge at the commanded position along the slide. It is readily implemented using servo controls of the type used to control the trim tabs of aircraft.

Figure 5:
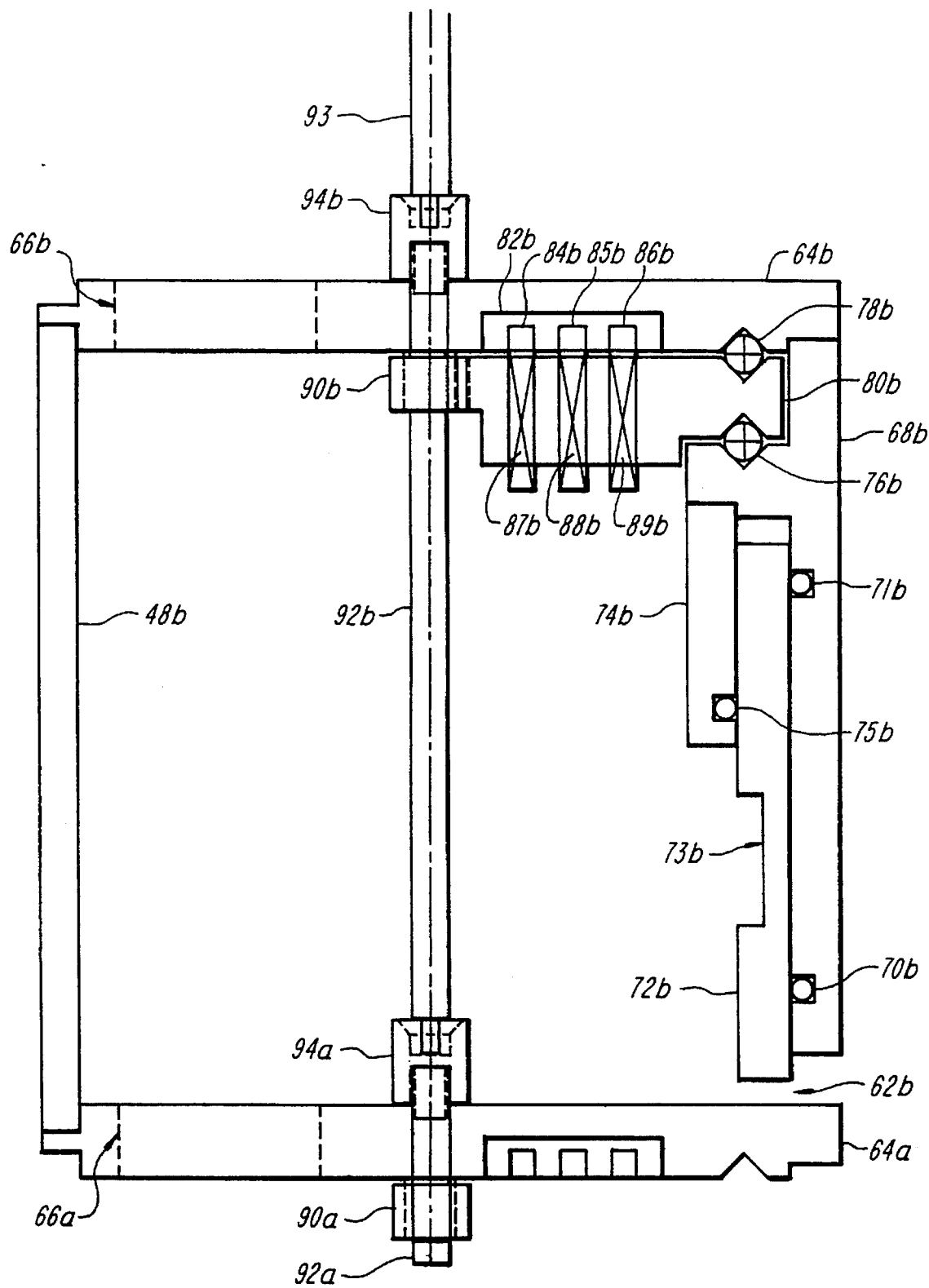
FIG. 5 is a partial cross sectional side view of the right side of the mechanical portion of the automatic thickness profiler of FIGS. 1 and 2.

FIG. 5 is a partial cross sectional side view of the mechanical portion of the automatic thickness profiler which rotates the assembly of 100b, 99b and 80b. Motor 58 in FIG. 2 turns drive shaft 93 which engages with coupling 94b to turn attached drive shaft 92b and drive shaft 92b engages with coupling 94a to turn attached drive shaft 92a. Gear 90b is fixed to drive shaft 92b and engages with gear plate 80b thus causing gear plate 80b to rotate. Control signals for actuator 99b FIG. 4 pass through slip rings 84b, 85b and 86b which are permanently embedded in plate 64b by electrical insulator 82b. Brushes 87b, 88b, and 89b are insulated from and fixed to gear plate 80b and are directed to slide directly on slip rings 84b, 85b, and 86b respectively.

Figure 6:
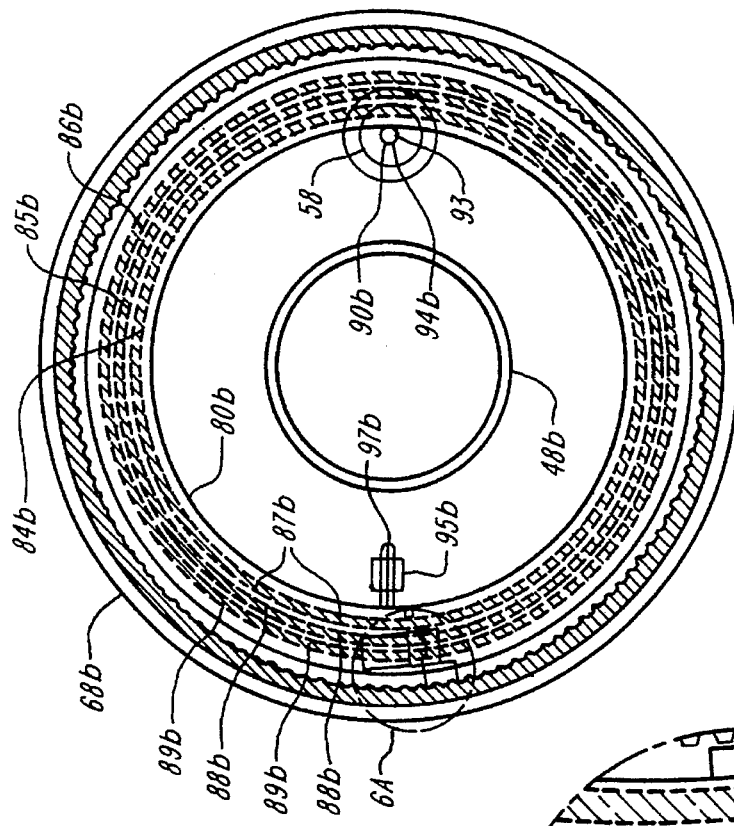
FIG. 6 is a schematic plan view of the mechanical portion of the automatic thickness profiler of FIGS. 1 and 2.

FIG. 6 is a schematic plan view of the mechanical portion of the automatic thickness profiler which shows that multiple brushes 87b, 88b, and 89b are used for slip rings 84b, 85b, and 86b respectively to eliminate electrical noise spikes caused by relative motion between brushes and slip ring. Walls 48b and 68b are annular in shape, as well as is gear plate 80b. Motor 58 drives shaft 93, coupling 94b and gear 90b and gear 90b engages with gear plate 80b. Limit switch 97b held fixed by bracket 95b tracks the position of gear plate 80b.

Figure 6A:
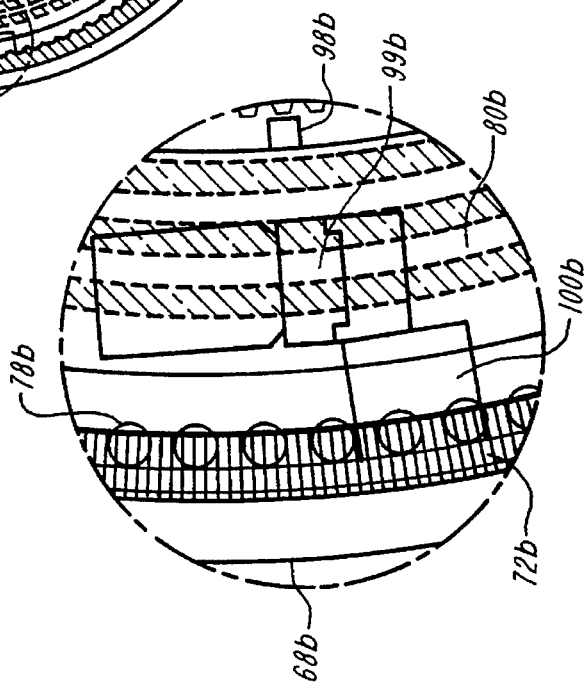
FIG. 6a is an enlarged schematic plan view of the circled portion of FIG. 6.

FIG. 6a is an enlarged schematic plan view of the circled portion of FIG. 6. Wall 68b is adjacent to and surrounds multiple slide plates 72b which appear as several small rectangles with their long directions radiating from the centerline of wall 68b. Positioning wedge 100b is attached to actuator 99b which is attached to plate 80b, both rotating together on ball bearings 78b. Positioning wedge 100b engages sequentially with slide plates 72b as wedge 100b is rotated around the centerline of wall 68b. The widest portion of wedge 100b determines the position (into the page in this drawing) of slide plates 72b, see also FIG. 4b. Reference block 98b provides a static reference target for each revolution of plate 80b.

The automatic profiler system normally operates by continuously measuring film thickness around the circumference of bubble 22 with sensor 102. On the basis of these measurements, control computer 106 calculates corrections to individual control zones to make the film of uniform thickness and effects changes to those zones by sending control signals to servo motor 99b. The servo motor causes positioning wedge 100b to move up and down on command as the wedge advances circumferentially. Slide plates 72b are individually, sequentially moved by positioning wedge 100b as the wedge progresses (is scanned) from one slide plate 72b to the next. When positioning wedge 100b passes and no longer influences the position of each slide plate 72b, it is held fixed in position by friction pads 70b, 71b and 75b. Scanning of the servo 99b and associated positioning wedge 100b is performed only as required to reposition the slide plates 72b to form the desired circumferential profile for gap 62b.

Line start-up or changeover to new product dimensions usually requires continuous scanning and change of gap 62b since the thickness profile must typically reach a new equilibrium. After equilibrium has been achieved and film 22 thickness deviations are minimized, the system scans a new profile into gap 62b only as required to keep thickness deviations to a minimum. Thus scanning new gap 62b profiles occurs less and less frequently over time.

The capability to minimize thickness variations is limited by how well the location of measured thickness deviations are correlated to associated control zones as defined by individual plates 72b. Correlation of thickness bands with control zones is directly accomplished by controller 106 entering a "Correlate" mode. This mode purposefully repositions a few zones (plates 72b) to induce narrow thickness bands in key positions around the circumference of film bubble 22. These induced bands are then detected by sensor 102. Since the positions of sensor 102 and the identity of the individual control zone slide plates 72b that have been changed are known, a direct correlation is obtained, with appropriate interpolation for zones for which the correlation was not directly performed. This enables precise, high resolution control of slide plates 102 by automatic thickness profile controller 102 to produce a blown film bubble 22 which is virtually free of thickness variation. Correlation is performed preferably after extrusion line changes have been completed during product changeovers. Film motion parameters such as the speed of travel of the film bubble defined by nip rolls 152 and 152a are monitored by controller 106 to provide continuous correlation of all zones during minor deviations in these parameters which might occur with normal extrusion line operation for a given product.

Figure 7:
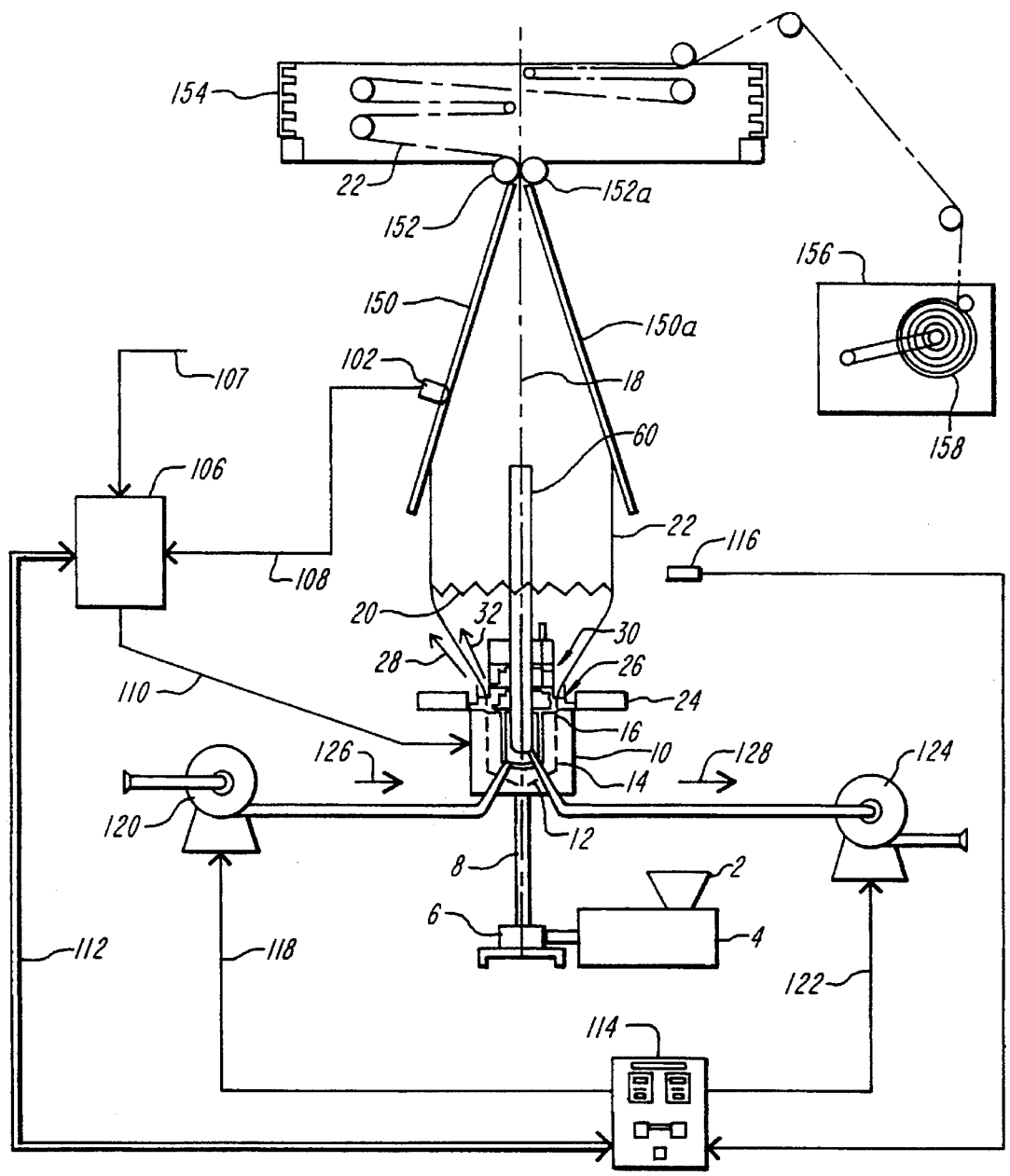
FIG. 7 is a schematic side view showing the blown film extrusion apparatus including a typical oscillating nip roll and the automatic thickness profiler.

FIG. 7 is a schematic side view showing the blown film extrusion apparatus modified to include a typical oscillating hauloff in combination with the automatic thickness profiler. Oscillating hauloff 154 functions to rotationally oscillate nip rolls 152 and 152a and collapsing frames 150 and 150a around process centerline 18 while redirecting plastic film 22a in such a way as to enable roll 158 to be wound on a fixed winder 156. This acts to distribute and average any small thickness bands that remain in bubble 22 on roll 156 by moving the position of the thickness bands on the roll 156 over time, as is known per se. Thickness sensor 102 in this embodiment is attached to and rotates with rotating collapsing frame 150. Alternatively it can be positioned on rotating plate 104 as shown in FIG. 1.

FIG. 8 is a schematic cross sectional side view of an automatic thickness profiler installed in an external, dual flow air ring. Air enters inlets 200 and passes inside plenum 202 where circumferentially variable air gap 207 adjusts the flow of air to lip 206 and also to lip 204 through air passages 205. Air gap 207 is adjusted in manner similar to FIGS. 2, 4, 5 and 6. Slide plates 222 are retained between walls 210 and 224 such that they can be mechanically repositioned vertically up and down but otherwise remain fixed in position. Positioning wedge 220 engages with slot 221 cut into slide 222. Wedge 220 is attached to and vertically positioned by actuator 218. Actuator 218 is attached to gear plate 212 by bracket 216. This actuator assembly 212, 216 and 220 is rotated on ball bearings 214 by drive motor 230 via coupling 229, shaft 228 and gear 226. Electric control signals are passed to actuator 218 by slip rings 232 and brushes 234. The radial position of actuator assembly 212, 216 and 220 is monitored by proximity switches 236 and 237.

FIG. 9 is a schematic cross sectional side view of an automatic thickness profiler installed in an external, single flow air ring. Air enters inlets 160 and passes inside plenum 162 where circumferentially variable air gap 167 adjusts the flow of air to lip 164, 166. Air gap 167 is adjusted in manner similar to FIGS. 2, 4, 5 and 6 except that the mechanical arrangement operates in the horizontal direction instead of vertically. Slide plates 182 are retained between walls 170 and 184 such that they can be mechanically repositioned horizontally back and forth but otherwise remain fixed in position. Positioning wedge 180 engages with slot 181 cut into slide plates 182. Wedge 180 is attached to and horizontally positioned by actuator 178. Actuator 178 is attached to gear plate 172 by bracket 176. This actuator assembly 172, 176 and 180 is rotated on ball bearings 174 by drive motor 190 via coupling 189, shaft 188 and gear 186. Electric control signals are passed to actuator 178 by slip rings 192 and brushes 194. The radial position of actuator assembly 172, 176 and 180 is monitored by proximity switches 196 and 197.

Figure 10:
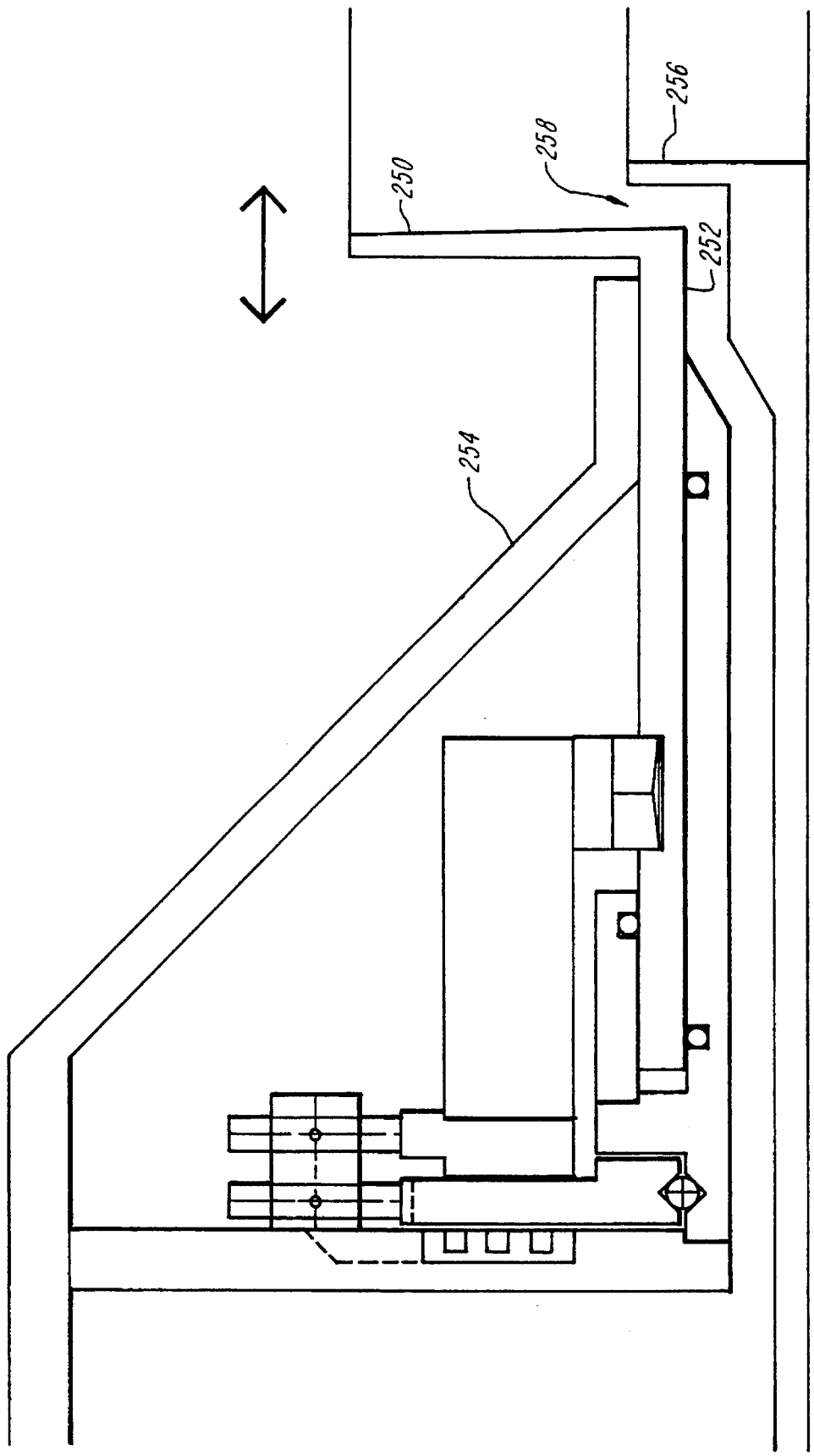
FIG. 10 is a partial cross sectional view of an exterior air ring having, in effect, a flexible lip shaped by a moving actuator according to the invention.

Referring to FIG. 10, in an alternative embodiment, air ring lip 250 is composed of thin vertical extensions of horizontally moveable, thin slide plates 252. Lip 250 therefore is adjustably moveable along its entire length, thus acting as a flexible lip in conjunction with forming a variable cross-section flow passage 258 with fixed lip 256.

In still another embodiment, an exterior cooling ring lip can be formed in thin segments by end formations of slide plates without the positions of these plates having influence on the cooling medium flow cross-section. In either case, control signals based upon desired change to the lip profile can be used to control the servo-driven wedge member to adjust the location of the individual plates in the manner described above to achieve the desired lip profile, e.g. to improve "lock down" and stability of the bubble. This provides a new form of control of the lip geometry to achieve better control of the process. This enables extension of the range of the extrusion line with respect to speed of operation, nature of resin extrudable and product specifications.

The present invention has been described in connection with certain structural embodiments and it will be understood that various modifications can be made to the above-described embodiments without departing from the spirit and scope of the invention as defined in the appended claims.

What is claimed is:

1. An air cooling device for an extrusion line for producing a running length of extrudate from a die, said cooling device constructed to provide a distributed flow of cooling air contacting a surface of the extrudate at a region downstream from said die, said cooling device having a series of adjustable members associated with respective zones of air flow for varying the volumetric flow at said zones, and at least one movable actuator constructed to move serially from one zone to another and, at each zone, constructed to adjust the position of the respective adjustable member to adjust the volumetric flow in said zone.

2. The air cooling device of claim 1 wherein said die is circular and said actuator is constructed to move on a circular track from zone to zone.

3. The air cooling device of claim 2 wherein said die is annular, constructed to extrude a tube and wherein said cooling device is constructed to provide a distributed flow of cooling air to the interior surface of the extruding tube, said adjustable members and said movable actuator being disposed within the interior of said extruding tube.

4. The air cooling device of claim 3 wherein said extrudate forms an air-confining bubble which is closed at the end opposite from the die by sealing of the sides of the tube together to substantially prevent air loss, and said movable actuator is energized and controlled by leads introduced into the bubble through a passage in said die.

5. The air cooling device of claim 1 wherein said cooling device is constructed to provide a distributed flow of cooling air to the exterior surface of the extrudate.

6. The air cooling device of claim 5 wherein said die is annular, constructed to extrude a tube and wherein said cooling device is constructed to provide a distributed flow of cooling air to the exterior surface of the extruded tube.

7. The air cooling device of claim 1 wherein said actuator is controlled in response to measurements of a detector located downstream of said cooling device, said detector adapted to measure a characteristic of said extrudate that varies in response to change in air flow from said cooling device.

8. The air cooling device of claim 7 wherein said extrudate is subjected to tension as it emerges in heated form from said die and said detector is constructed to measure thickness of the extrudate at a region downstream from said cooling device.

9. The air cooling device of claim 8 wherein said detector scans thickness of the extrudate and feeds its thickness and position data to a control computer, said control computer adapted to act on said data to correlate given locations of thickness measurement to respective zones and to establish required changes in the flow cross section of said zones to reduce thickness variation about said extrudate.

10. The air cooling device of claim 1 further comprising a plenum and wherein the volumetric flow through said zones is controlled by respective adjustable members that control the flow cross-section of respective apertures.

11. The air cooling device of claim 1 wherein said adjustable members comprise slideable members.

12. The air cooling device of claim 11 wherein each of said slideable members is resiliently engaged by a friction element that holds it in place after its adjustment.

13. The air cooling device of claim 11 wherein said slideable members comprise a series of side by side slide plates.

14. The air cooling device of claim 11 wherein end portions of said slideable members comprise segments of an air ring lip.

15. The air cooling device of claim 11 wherein said actuator is in the form of a motor-driven wedge constructed to enter with advancing motion into an opening at the side of each slideable member and to move laterally in response to a control signal to reposition the respective member before moving on to the next.

16. The air cooling device of claim 11 in combination with a detector for measuring thickness of extrudate following said cooling device and a computer responsive to said thickness measurements to produce said control signals for positioning respective slideable members.

17. The air cooling device of claim 1 having at least two series of said adjustable members spaced apart along the direction of travel of the extrudate and at least one of said movable actuators for each of said series, said actuators for each of said series being mounted on a common carrier that moves the actuators serially along their respective series of adjustable members.

18. The air cooling device of claim 17 in the form of an internal bubble cooling device in which both of said series of adjustable members are mounted to reside within said bubble.

19. The air cooling device of claim 1 constructed for use in a blown film line having at least two series of said adjustable members, one disposed on the exterior of the bubble and the other disposed on the inside of said bubble, each series having its respective said actuator.

20. An air cooling device for an extrusion line for producing a running length of blown tubular form extrudate from an annular die, said cooling device constructed to provide a distributed flow of cooling air about an inner surface of the tubular extrudate at a region downstream from said die, said cooling device having a series of adjustable members associated with respective zones of air flow for varying the volumetric flow at said zones, and at least one movable actuator, constructed to move serially from one zone to another and, at each zone, constructed to adjust the position of the respective adjustable member, to adjust the volumetric flow along the inner surface of the extrudate in said zone.

21. The cooling device of claim 20 wherein said cooling device is operatively connected with an internal bubble cooling control system that includes supply and exhaust blowers and a bubble size control device.

22. The air cooling device of claim 20 wherein a single actuator moves between the respective zones.

23. The air cooling device of claim 20 including a control system which includes a computer responsive to a signal related to measured thickness of said extrudate to provide control signals to said at least one movable actuator.

24. The air cooling device of claim 23 wherein an adjustment of one of said adjustable members at one zone causes an adjustment associated with other zones to maintain the volume of air in said tubular form extrudate constant.

25. The air cooling device of claim 23 wherein said cooling device comprises an input blower and an output blower and said control system is constructed to adjust the speed of at least one of the blowers to maintain the volume of air in said tubular form extrudate constant upon change in the adjustment of one of said adjustable members.

26. The air cooling device of claim 25 wherein said control system includes a computer for receiving signals related to the size of said tubular form extrudate and flow cross-section of said zones and based on said received signals provides output signals to at least one of said input and output blowers to change the air flow of at least one of the blowers.

27. The air cooling device of claim 26 wherein said computer provides signals to one of said input and output blowers based on said size of said tube and provides signals to the other of said blowers based on the sum of the flow cross-sections of said zones.

28. The air cooling device of claim 20 wherein said adjustable members comprise slideable members in the form of a series of side by side slide plates, each of said slideable members being resiliently engaged by a friction element that holds it in place after its adjustment.

29. The air cooling device of claim 28 wherein said actuator is in the form of a motor-driven wedge constructed to enter with advancing motion into an opening at the side of each slideable member and to move laterally in response to a control signal to reposition the respective member before moving on to the next.

30. An internal cooling system for cooling extrudate in the form of a tube emerging from an annular extrusion die, a dimension of the tube being dependent upon the amount of air entrapped in a closed volume of the tube adjacent the die, said internal cooling system constructed to distribute a flow of cooling air to the inner surface of the extrudate through a series of flow zones, the flow cross-sections of which are adjustable in response to thickness measurements, and a control system adapted to monitor the flow cross-section of each of said zones, said control system constructed and arranged to make compensating adjustments in said internal cooling system to maintain the volume of air in said tube constant upon flow cross-section change at any of said zones.

31. The internal cooling system of claim 30 further comprising a series of adjustable members associated with respective zones of said flow, and at least one movable actuator constructed to move from one zone to another and constructed to adjust the position of the respective adjustable member to adjust the volumetric flow in said zone.

* * * * *